Figures 7, 8:
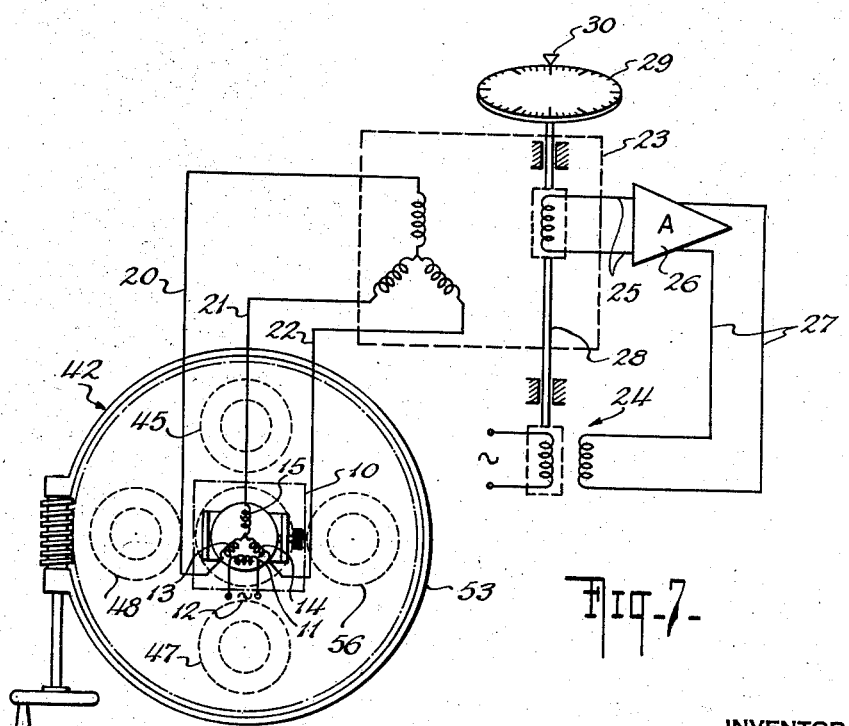

May 26, 1959     W. HALPERN ET AL     2,887,873
METHOD OF MEASURING AND COMPENSATING FOR DEVIATION ERRORS
IN EARTH'S FIELD SENSITIVE DIRECTION INDICATORS
Filed Feb. 23, 1956     4 Sheets-Sheet 1
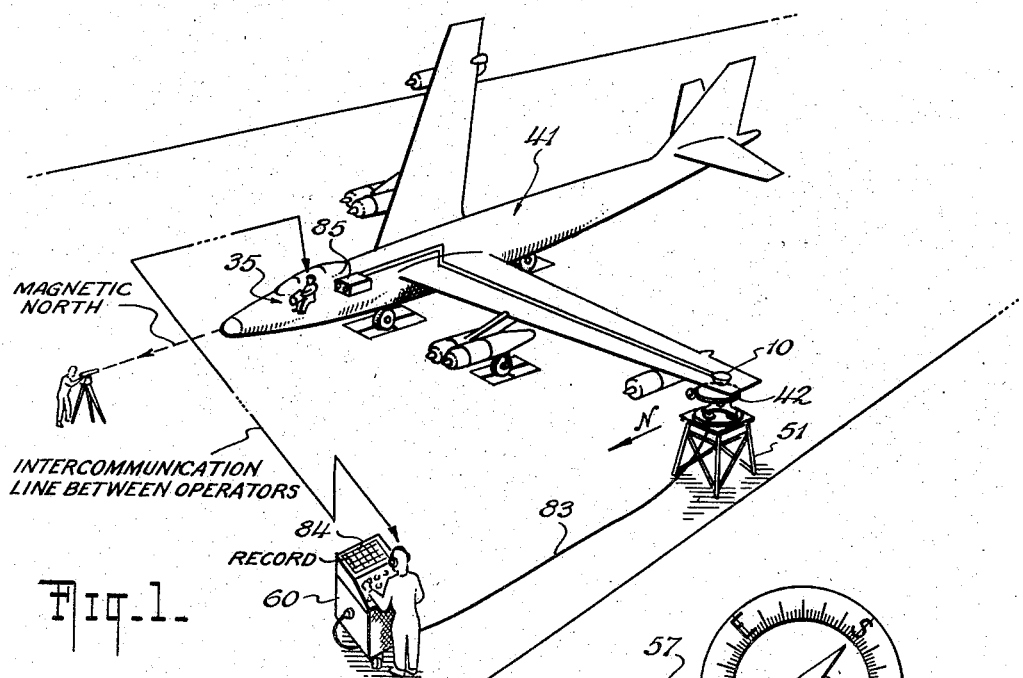
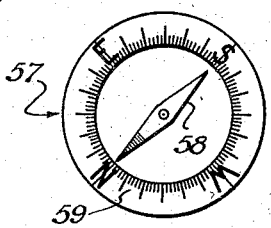
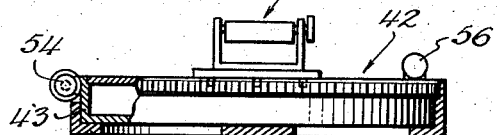
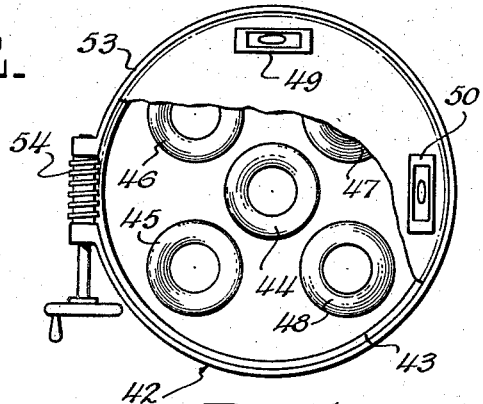
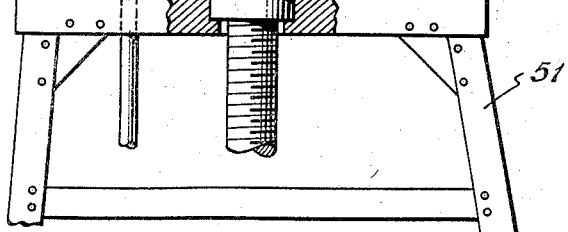
INVENTORS
WILLIAM HALPERN
MARLIN C. DEPP
BY CAESAR F. FRAGOLA
Arthur H. Serrell
ATTORNEY

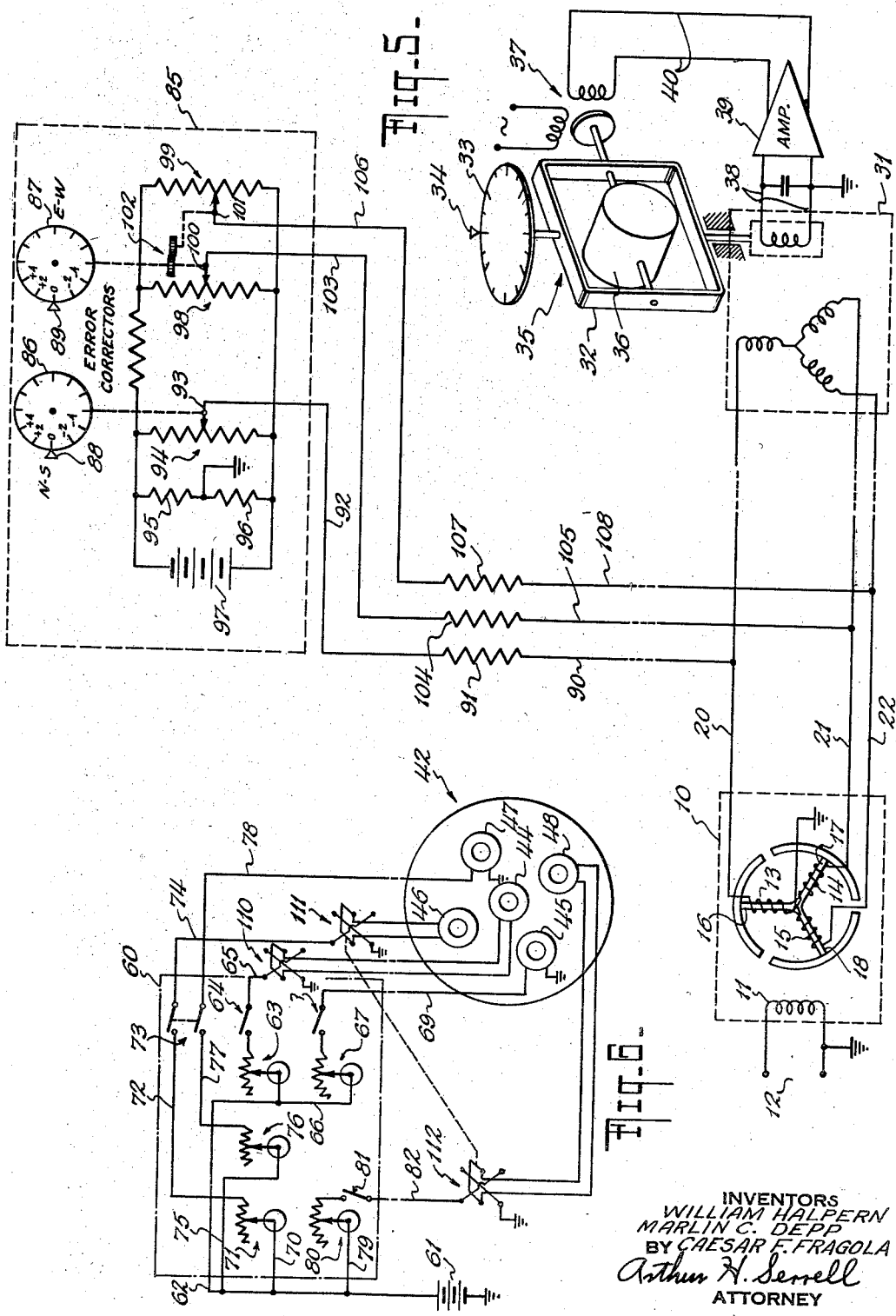

DEVIATION TABLE

| MAGNETIC HEADING AZIMUTH DIRECTION | COMPASS | DEV. E | MAGNETIC HEADING AZIMUTH DIRECTION | COMPASS | DEV. E |
|---|---|---|---|---|---|
| 0 | 2 | +2 | 180 | 179 | −1 |
| 15 | 17 | +2 | 195 | 194 | −1 |
| 30 | 33 | +3 | 210 | 208 | −2 |
| 45 | 48 | +3 | 225 | 223 | −3 |
| 60 | 64 | +4 | 240 | 237 | −3 |
| 75 | 78 | +3 | 255 | 252 | −3 |
| 90 | 93 | +3 | 270 | 267 | −3 |
| 105 | 107 | +2 | 285 | 283 | −2 |
| 120 | 122 | +2 | 300 | 299 | −1 |
| 135 | 136 | +1 | 315 | 315 | 0 |
| 150 | 150 | 0 | 330 | 330 | 0 |
| 165 | 164 | −1 | 345 | 346 | +1 |

INVENTORS
WILLIAM HALPERN
MARLIN C. DEPP
CAESAR F. FRAGOLA
BY Arthur H. Serrell
ATTORNEY

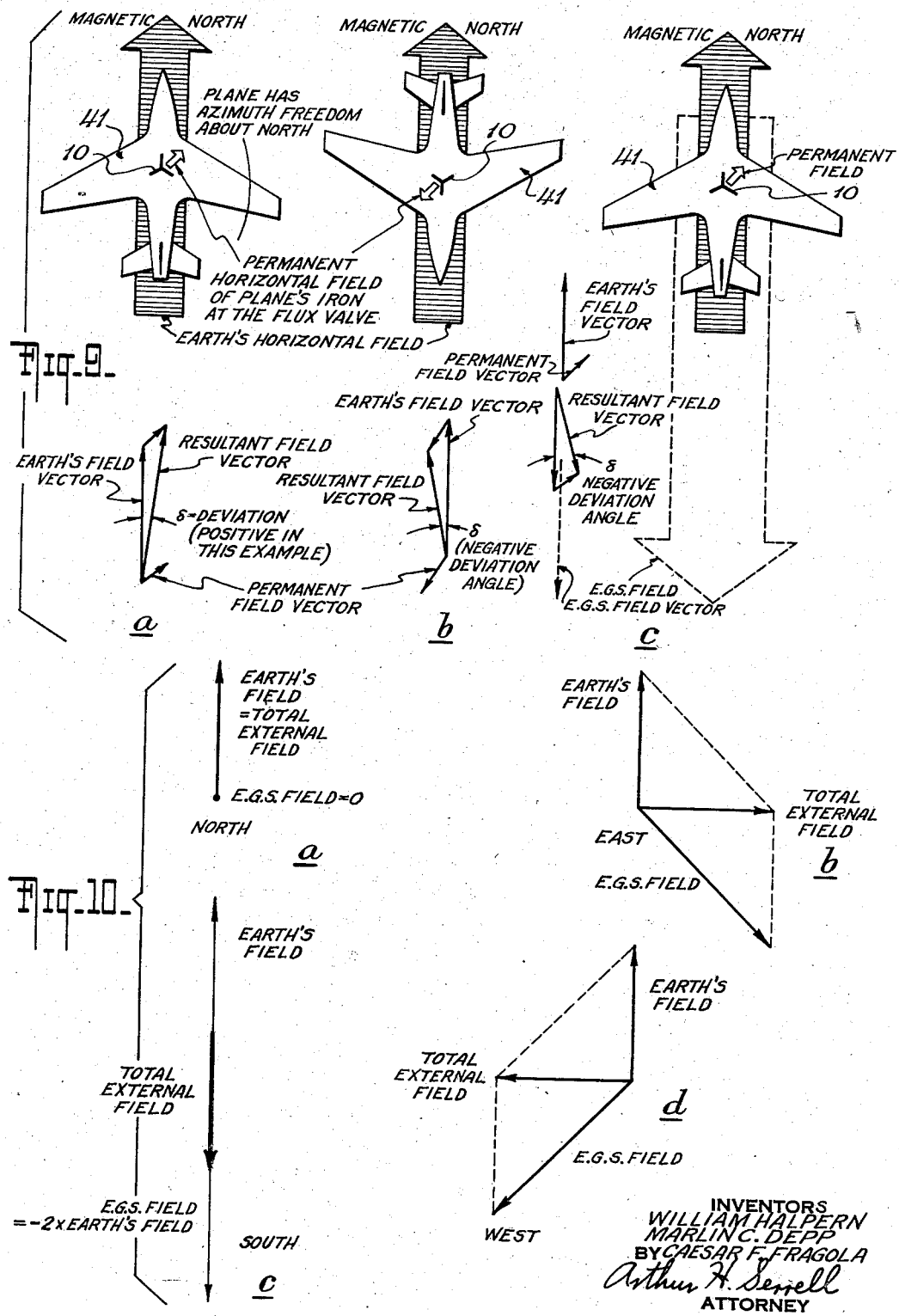

United States Patent Office 2,887,873
Patented May 26, 1959

2,887,873
METHOD OF MEASURING AND COMPENSATING FOR DEVIATION ERRORS IN EARTH'S FIELD SENSITIVE DIRECTION INDICATORS

William Halpern, Great Neck, Marlin C. Depp, Peekskill, and Caesar F. Fragola, Roosevelt, N.Y., assignors to Sperry Rand Corporation, a corporation of Delaware Application February 23, 1956, Serial No. 567,204

15 Claims. (Cl. 73—1)

This invention relates to a method for measuring and compensating for deviation errors in earth's field sensitive direction indicators for dirigible craft such as magnetic compasses, flux valve compass systems, and flux valve slaved directional gyro systems.

Present calibration of such compass indicators or systems for the noted error necessitates the actual swinging of the craft utilizing the system with reference to the ground to known magnetic headings through a range of 360 degrees to ascertain the error with sufficient accuracy for navigation purposes. This method is extremely impractical for the systems of such craft as heavy bomber aircraft, large cargo type aircraft, and marine vessels. Our improved method is conducted with the craft stationary with respect to the ground during the calibration procedure, the swinging being accomplished electrically by the creation of a plurality of regulated, electromagnetic fields that with the horizontal component of the earth's field provide a number of resultant fields with directivity corresponding to a succession of known azimuth directions.

Deviation is herein defined as the angular difference between magnetic heading and the compass or directional gyro indicated heading of the craft due to local magnetic attraction in the vicinity of the flux valve of the system. Various sources of local attraction carried by a craft of any navigable type, marine, land or air, provide disturbing fields for the sensitive flux valve of the systems such as permanently magnetized portions of the body structure of the craft, the engine and associated equipment for moving the craft, general electrical equipment carried by the craft such as power generators, radio transmitters and other obvious devices that operate to provide a magnetic or electric field. The disturbing or hard iron field is fixed to the craft, its resultant direction being dependent on the location of the disturbing sources on the craft and the relative strength of the same. When the craft changes heading through 360 degrees, the disturbing resultant hard iron field moves with it to make a 360 degree rotation with respect to the earth's field. This causes the horizontal component of the total magnetic vector, the sum of the earth's field and the disturbing field, to oscillate with respect to the normal direction of the earth's field. The noted flux valve systems sense the sum of the fields so that the deviation error goes through one positive maximum and one negative maximum during a 360 degree change in heading. A deviation chart or table for a particular craft is included in the drawings to show how the deviation error changes in the manner described and is dependent on the azimuth direction or heading of the craft at a particular instant. For the accurate navigation of any craft depending on a flux valve compass or directional gyro system of the character noted, it is necessary to take deviation error into account and to make the necessary correction for the same either in adjusting the heading of the craft from a deviation table or compensating the system for the error through suitable compensating means set to correct the indication of the system for the error. The first adjustment is resorted to only in instances where the systems themselves have no deviation compensating devices included therein.

Deviation errors in the noted directional instruments or systems are measured and compensated for by our improved method without the need of physically swinging the craft with respect to the ground to align the same at a number of standard known magnetic headings. The improved method is particularly advantageous with regard to aircraft as the electrical swinging procedure thereof is conducted with the craft grounded and in a stationary condition with respect to the earth.

The present invention requires the accurate measurement and reproduction of the horizontal component of the earth's magnetic field in both magnitude and direction. This field is reproduced in accordance with the present inventive concepts by creating an electromagnetic field which allows the resultant horizontal field at the flux valve of the system to assume any azimuth direction. This is accomplished in the instant case by regulation of the direct currents in a ground swinging coil unit that is separate from the flux valve sensitive element of the system through suitable electrical controllers where settings are recorded to obtain a required electrical ground swinging record. In the subject invention, the electrical swinging record is made apart from both the flux valves of the system and the craft by means of a separate magnetic field responsive azimuth direction indicator that is removed from the coil unit after the recording procedure is completed.

Other advantages and practices of our improved method will become apparent in the following detailed description of the subject invention in relation to the accompanying drawings, wherein, Fig. 1 depicts a pictorial representation of the components utilized in the practice of our improved method showing a possible arrangement of the same with respect to the craft and the ground, Fig. 2 is a side elevation of the electrical ground swinging coil unit and the orienting fixture or magnetic field responsive azimuth direction indicator component showing the same in connected relation on a platform, Fig. 3 is a detail plan view of the fixture component illustrated in Fig. 2, Fig. 4 is a detail plan view of the coil swinging unit illustrated in Fig. 2, Fig. 5 is a schematic view and wiring diagram of a flux valve slaving directional gyro system showing deviation compensating controllers therein that introduce direct currents to the secondary windings of the flux valve component of the system, Fig. 6 is a circuit diagram showing the connections between the coil unit and the potentiometers and switches constituting the electrical controllers for the same, Fig. 7 is a view similar to Fig. 5 of a flux valve compass system in which the position of the valve in relation to the coil unit is clearly illustrated, Fig. 8 shows a representative deviation table or chart that in the chosen example indicates a positive maximum deviation error of the system at 60 degrees heading and a negative maximum deviation error between from 225 to 270 degrees heading, Figs. 9(a), 9(b) and 9(c) depict corresponding graphic and vector diagrams of the earth's magnetic field, the electrical ground swinging field (E.G.S.) and the resultant field utilized in explanation of the theory of the electrical ground swinging procedure, and Figs. 10(a), 10(b), 10(c) and 10(d) are further vector diagrams demonstrative of an electrical ground swinging operation.

With reference to the drawings, our improved method is embodied in earth's field responsive compasses of the flux valve type as shown in Fig. 7 and flux valve slaving directional gyro type as shown in Fig. 5. The earth's field sensitive element of such systems is represented in the drawings as a three legged flux valve of the character shown and described in U.S. Letters Patent 2,383,460, dated August 28, 1945 for Magnetic Field Responsive Devices. This component of the system is generally designated in the drawings in Figs. 1, 5 and 7 by the reference character 10. As depited in Fig. 5, the primary coil 11 of the flux valve is energized from a suitable source of alternating current electrical energy 12. The secondary coils 13, 14 and 15 of the respective equiangularly spaced flux conducting legs 16, 17 and 18 of the flux valve 10 provide a controlling output dependent on its position in azimuth in the earth's magnetic field by way of leads 20, 21 and 22. The receiver for the controlling or slaving flux valve output signal shown in Fig. 7 is a compass card driving repeater and the system provided is a flux valve compass system of the type shown and described in U.S. Letters Patent 2,427,654, dated September 23, 1947 for Remote Reading Flux Valve Compass Systems. In Fig. 5, the controlling output signal of the flux valve 10 is utilized to slave a directional gyro and the system provided is a flux valve slaving directional gyro system of the type shown and described in U.S. Letters Patent 2,357,319, dated September 5, 1944 for Flux Valve Magnetic Compasses.

In the compass system shown in Fig. 7, the stator of an electrical comparator 23 is connected to the input leads 20, 21 and 22. The rotor of the comparator 23 provides an output to drive a repeater motor 24 by way of leads 25, amplifier 26 and leads 27. The rotor of the repeater motor 24 and the rotor of the comparator 23 are located on the shaft 28 of a movable compass card 29. The card 29 is moved in accordance with the output of the flux valve 10 until a null signal is obtained from the rotor of the comparator 23. The card 29 is accordingly stabilized in azimuth by the field sensed by the flux valve. Card 29 provides an azimuth indication with respect to a lubber line 30 that is fixed in relation to the craft, the relative positions of the parts providing an indication of the course of the craft on which the system is employed. The azimuth directional indication provided by the system could be obtained also where a pointer is driven by the repeater motor 24 in relation to a compass card that is fixedly mounted on the craft.

In the gyro slaving system shown in Fig. 5, the comparator element is indicated at 31, the rotor part thereof, in this instance, being connected to an extension of the lower trunnion of a gimbal ring 32 of the gyro. The upper trunnion of ring 32 supports or drives an azimuth direction indicating compass card 33 that is read in relation to a lubber line 34 fixed to the craft. The directional gyro generally indicated at 35 includes a rotor case 36 that is torqued about its horizontal axis of support in ring 32 by a suitable torque motor 37. The control winding of the torque motor element 37 of the system is energized by the output of the rotor of the comparator 31 by way of leads 38, amplifier 39 and leads 40 so as to precess the rotor case 36 about its ring axis until a null signal is obtained from the rotor of the comparator 31. The output of the flux valve 10 accordingly slaves the directional gyro 35 so that the card 33 of the system is readable on line 34 to provide an indication of the course of the craft utilizing the system.

In the practice of the present invention, the earth's field sensitive element of the compass systems noted is a flux valve that has been mounted in the craft that it is utilized in. As applied to aircraft, a flux valve unit 10 is shown in Fig. 1 as fixedly located in a suitable position in one of the wings of the craft. Advantageously, the valve is located in the craft at a position therein that is most remote from sources causing deviation error. An illustrative craft in the form of an aircraft 41 utilizing one of the compass systems herein described is shown in Fig. 1.

The initial step in the improved method is conducted apart from the craft 41 utilizing the flux valve compass system being conducted in an open field location such as at an airport that is as far removed as possible from any local magnetic disturbances of its own. Any region of minimum magnetic disturbance into which the craft may be conveniently moved is useful for this purpose. Accordingly, the ground location in which the method is conducted may be considered substantially free of any outside magnetic disturbances.

The first step in the procedure is necessary in order to obtain the required electrical ground swinging record. This consists in orienting a unit with a plurality of field generating coils therein and a magnetic field responsize azimuth direction indicator connected thereto and responsive to the field produced by the unit in a predetermined and preferably northerly direction in the earth's magnetic field. As shown in Figs. 1 to 4 of the drawing, the coil unit is generally indicated at 42. Unit 42, as shown, consists of a housing with a central horizontally disposed fixed coil 44 and four equiangularly disposed horizontal fixed coils 45, 46, 47 and 48. Two of the oppositely paired coils, for example, coils 45 and 47, are arranged with their centers symmetrically disposed in the coil unit 42 and with their field axes in a vertical plane containing the field axis of vertically disposed coil 44. The other oppositely paired coils 46 and 48 are situated with the vertical plane containing their field axes in perpendicular relation to the vertical plane containing the field axes of coils 45 and 47. The cover part of the coil unit has perpendicularly disposed level indicating devices 49 and 50 thereon. Coil unit 42 is located in a level condition on a platform 51 that is set in a position on the ground just below where the flux valve 10 is to be located when the craft is positioned as shown in Fig. 1. With reference to Fig. 2, platform 51 includes a table part 52 that is adjustable vertically and a holder part 53 in which the housing 43 of the coil unit is adjustable in azimuth. To facilitate the last-noted adjustment, a worm gear 54 is provided on the holder that meshes with the toothed periphery of the housing 43 of the coil unit. Housing 43 and holder 53 have telescopically interfitting cylindrical walls so that the coil unit may be adjusted by manipulation of the worm gear 54. Holder 53 is universally connected to the table 52 and is levelled with respect to the ground by suitable levelling means such as the adjustable thumb screw connections 55 provided between the parts. The vertical adjustment shown is constituted of a suitable jack with bevel gears 56 actuating parts. The platform is set up as shown in Fig. 1 with the coil unit 42 at the correct elevation for the craft, although the craft is not present, and with the liquid levels 49 and 50 indicative of the fact that the unit is in a level condition. To orient the coil unit 42 in the earth's field, a magnetic field responsive azimuth direction indicator as represented at 57 is connected to the cover of the unit 42 by means such as a pin and slot connection. Indicator 57 as represented in Fig. 3 may be a magnetic compass with an earth's field responsive sensitive element as the positioning element of a needle directing part 58. The housing 59 of the indicator 57 includes compass card graduations thereon that are readable with the needle 58 to provide a directional indication. Indicator 57 is arranged on the coil unit 42 in a location that corresponds to the position taken by the flux valve element 10 on the craft when it is moved into the position shown for the same in Fig. 1. The indicator 57 is also responsive to the field of the coil unit 42. In the orienting step no field is provided by the unit 42, and by adjustment of the worm wheel 54, the unit 42 and the housing 59 of the indicator 57 connected to the unit are moved in relation to the earth's field to a predetermined direction in which the card graduation north is preferably adjacent the indicating needle 58. When so oriented, the horizontal field providing opposite coils 45 and 47 have their axes in a vertical plane containing the horizontal component of the earth's field as represented in the orientation with flux valve 10 in Fig. 7 where secondary coil 15 is located in a northerly direction. Coils 46, 48 of the unit 42 provide horizontal fields at right angles to the determined orientation and accordingly have their axis in a vertical plane containing the east-west direction. Accordingly, the orienting step of the method is completed when a stationary unit 42 with a plurality of field generating coils 44, 45, 46, 47 and 48 therein and a magnetic field responsive azimuth direction indicator 57 connected thereto and responsive to the field of the unit are arranged in a predetermined direction in the earth's magnetic field apart from the craft.

The next step in the method is also conducted without the presence of the craft and consists in electrically swinging the oriented coil unit 42 and indicator 57 from a control station indicated at 60 in Fig. 1 that is remote from the stationary unit and indicator. In this step, an operator is required to adjust the settable electrical controllers of the station 60 and a further operator is needed to read the indicator 57. As shown, the panel of the control station 60, Figs. 1 and 6, includes a switch and potentiometer in series relation in respective circuits for the individual coils of the coil unit 42. As represented, coil 44 may be supplied with direct current electrical energy from battery 61 by way of lead 62, potentiometer 63, switch 64, lead 65 and reversing switch 110. The energizing circuit for coil 45 includes the battery 61, lead 62, lead 66 to lead 62, potentiometer 67, switch 68 and lead 69. Coil 46 is likewise energized from the battery 61 and lead 62 by way of lead 70, potentiometer 71, lead 72, one branch of the double pole switch 73, lead 74 and reversible switch 111. Further, coil 47 is energized from the battery 61 and lead 62 by way of lead 75, potentiometer 76, lead 77, the other branch of the double pole switch 73, and lead 78. The last of the noted coils 48 is energized from the battery 61 and lead 62 by way of lead 79, potentiometer 80, switch 81, lead 82 and reversible switch 112. As shown, a ground connection is provided for each of the coils 44, 45, 46, 47 and 48 as well as battery 61. The reversing switch 110 in the input circuit to coil 44 controls the direction of the magnetic field established by the coil in order to compensate for possible small imperfections in the physical geometry of the coils. Switches 111 and 112 are ganged as shown in order to provide directivity of the athwartship field to both easterly and westerly headings as controlled by the opposite coils 46 and 48. The leads 82, 69, 65, 74, 78 interconnecting the control station 60 and the unit 42 are contained within a shielded cable 83 of sufficient length as to permit the station to be relatively remote from the unit. A suitable intercommunication line between the operators may be utilized in this step of the method, as illustratively depicted as used by the operators in Fig. 1 in conducting a different step in the improved method. The adjustable knobs of the respective potentiometers 71, 76, 63, 80 and 67 and the engageable switch arms of the respective switches 73, 64, 68 and 81 are located on the instrument panel of the control station in a position for adjustment by the human operator stationed at this point as indicated in Fig. 1. In this step of the method, one of the operators makes the necessary adjustments at the control station 60 and the other of the operators observes the readings on the indicator 57 to electrically swing the unit and indicator over a range of 360 degrees through a succession of azimuth directions by introducing direct currents to the coils of the coil unit 42 through the settable electrical controllers to provide a directive field equivalent to the earth's field for each of the azimuth directions as observed on the indicator 57. The controllers provided are the described potentiometers 71, 76, 63, 80 and 67 and the switches 81, 68, 64 and 73 which are manipulated by the human operator at the remote control station 60.

Fig. 10 of the drawing provides an illustrative vector explanation of four points of the electrical swinging operation. In the initial oriented condition of the coil unit 42, the earth's field is equal to the total external field to which the sensitive element of the indicator is subjected as depicted in Fig. 10(a). In this condition, no excitation is provided for any of the coils 44, 45, 46, 47 and 48, and the switches 73, 64, 68 and 81 are open. Accordingly, the electrical ground swinging field represented in Fig. 10(a) as the (E.G.S.) field is equal to zero. The reading on the indicator 57 is north. In Fig. 10(b), the directional indication of the indicator 57 is east. In order to move the needle 58 of indicator 57 to obtain this representation while leaving the coil unit 42 and indicator housing stationary and oriented in the earth's field, it is necessary to produce an E.G.S. field of the magnitude and direction shown in Fig. 10(b). The swinging field is obtained by the introduction of direct current to the necessary coils of the coil unit to obtain the result. As the earth's field remains constant both in direction and magnitude, the total external field sensed by the needle 58 is such as to provide an easterly reading on the indicator. Fig. 10(d) shows the direction and magnitude of the E.G.S. field required to produce a westerly reading on the indicator 57. As noted in this figure, the resultant or total external field influencing the indicator 57 is directed westerly. In order to obtain a southerly reading from indicator 57, it is necessary to produce an E.G.S. field that is opposite in direction to the earth's field and twice the magnitude of the earth's field. This arrangement of the respective designated vectors is shown in Fig. 10(c). In the swinging operation, the succession of directive fields for the indicator 57 is obtained by adjusting the controllers supplying energy to the required coils of the coil unit. The operator at the control station 60 performs this function by setting the requisite switches and potentiometer knobs at the control panel. As shown in Fig. 3, the indicator 57 provides compass indicia that are spaced at 15 degree intervals. In the E.G.S. swinging procedure, the needle pointer 58 is moved in a desired sequence to a desired number of the compass positions. The continuity of the needle movements in the swinging procedure is not material. The observer at the indicator 57 cooperates with the operator at the control station by checking the readings of the indicator during the swinging procedure.

As the described swinging procedure occurs, the operator at the control station 60 makes a record of the settings of the controllers provided by the potentiometers 71, 76, 63, 67 and 80 and switches 73, 64, 68, 81, 110, 111 and 112 on a chart indicated at 84 in Fig. 1. This is necessary in order to have a permanent record that can thereafter be referred to to reproduce the E.G.S. fields such as shown in Fig. 10 in both magnitude and direction. This step in the procedure accordingly consists in making a record of the settings of the noted controllers for each of the observed directions. For a particular test location of the described equipment, it is only necessary to make a single record. Thereafter, the swinging operations at the test location are conducted in connection with the craft containing the compass system with regard to the record.

The following step in the procedure consists in the disconnection and removal of the indicator 57 from the coil unit 42. In this step, the indicator 57 is lifted upwardly out of its slotted connection in the cover of the unit 42 without changing the orientation of the unit and taken from the test location.

In the next step of the procedure, the craft 41 with the compass system thereon is wheeled to the test location as depicted in Fig. 1. It is positioned in the location with its longitudinal axis in the oriented condition of the coil unit 42 in the earth's magnetic field. Orientation of the craft may be accomplished in any suitable manner. As shown, the orientation may be accomplished optically by a surveying instrument sightable along the craft and on a distant location of known magnetic north directivity from the instrument. A further criterion in this step of the method is that the flux valve 10 of the system be located in the relative position of the removed indicator 57. Where the flux valve 10 is in the wing of a given type aircraft, as shown, the platform is initially located so that the coil unit will be correctly positioned to satisfy this condition. It will be understood that this step also orients the flux valve of the system in the earth's magnetic field so that it assumes the same azimuth direction as the removed indicator 57. Further, where the compass system of the craft includes a settable deviation compensator such compensator is set in a non-correcting condition.

With reference to Fig. 5, the deviation compensator indicated at 85 functions through a pair of settable controllers or error corrector knobs 86 and 87 to introduce direct current to the secondary windings 13, 14 and 15 of the flux valve 10 of the system. Conventional devices of this character consist of a number of small permanent bar magnets whose relative positions in azimuth can be changed by rotating two set screws from the outside of the device. The compensating magnets are located in the vicinity of the valve and may be incorporated in the same structure as the valve or an independent housing that is suitably attached to the valve. Because of the location of the valve in the craft, the noted conventional compensating devices which are correspondingly located may be difficult to adjust or set. The compensator 85 shown in Fig. 1 is advantageous in the fact that it is remote from the valve 10 and the knobs 86, 87 thereof are readily accessible to the operator in the cabin of the craft. The N—S error corrector knob 86 is calibrated as indicated and in this step of the procedure the zero marking is set opposite the fixed index 88. The E—W error corrector knob 87 is likewise set in relation to the fixed index 89.

The magnetic fields at the valve 10 required for a desired compensation are obtained by proper adjustment of the magnitude and polarity of direct currents from the compensator 85. As shown in Fig. 5, secondary coil 13 of the valve may be supplied with compensating current by way of lead 20, connecting lead 90, resistor 91 and lead 92 to the slider arm 93 of a potentiometer 94. With the slider 93 set for zero output by knob 86, the potentiometer is located in a balanced bridge circuit with resistors 95 and 96 that is energized by battery 97. Movement of the knob 86 in a clockwise or counterclockwise direction unbalances the bridge and determines the magnitude and polarity of the compensating current supplied the coil 13 by way of lead 93, resistor 91, lead 90 and lead 20. Potentiometers 98 and 99 are similar to potentiometer 94. The sliders 100 and 101 of the respective potentiometers 98 and 99 are moved differentially by the knob 87 through a reversing gear connection 102. Movement of knob 87 accordingly unbalances the respective bridges including the potentiometers 98 and 99 differentially so that the outputs thereof are of different polarities although of corresponding magnitudes. The compensating current of the error corrector from the slider 100 is fed the secondary coil 14 of the flux valve 10 by way of lead 103, resistor 104 and lead 105 to lead 21. Current of opposite polarity from slider 101 is fed the secondary coil 15 of the flux valve 10 by way of lead 106, resistor 107, and lead 108 to lead 22. Resistors 91, 104 and 107 serve the purpose of isolating the compensator 85 from the flux valve and repeater elements of the system shown in Fig. 5. This considered step of the procedure consists in positioning the craft with the system therein in the coil unit oriented predetermined direction in the earth's magnetic field with the flux valve thereof in the relative position of the removed indicator and the deviation controllers if included in a non-correcting condition.

The next step consists in electrically ground swinging the stationary craft. This step occurs as represented in Fig. 1 with one of the operators at the control station 60 and the other operator in the cabin of the craft observing the repeater element of the system. This could be either the directional gyro controlled compass card 33, Fig. 5 or the motor driven repeater compass card 29, Fig. 7. The theoretical basis for the electrical ground swinging technique is represented in Fig. 9. In this figure, the small arrow shown is termed the permanent horizontal field of the plane's iron at the flux valve. This field is the cause of the deviation error and its magnitude and direction are determined by the combined effect of the various sources of local attraction carried by the craft as hereinbefore set forth. As represented, the directivity of this disturbing permanent field changes with change in the azimuth position of the craft and flux valve in relation to the earth's magnetic field. In a ground rotation of the craft, the permanent disturbing field and the flux value 10 move together in relation to the earth's magnetic field. The craft is indicated at 41 and the flux valve at 10 in Fig. 9. The large arrow representation in this view is magnetic north or the horizontal component of the earth's magnetic field in both magnitude and direction.

As located in accordance with the teaching of the present invention, the craft 41 and flux valve 10 are oriented in the earth's magnetic field as represented in Fig. 9(a). The disturbing field shown by the small arrow in Fig. 9(a) corresponds to the disturbing permanent iron field for the given aircraft and its direction and magnitude as vectorially presented are arbitrarily selected for purposes of explanation of the swinging procedure.

The card of the compass repeater observed by the operator in the cabin of the craft will always indicate a direction corresponding to the resultant field at the flux valve. This field is represented in Fig. 9 as the resultant field vector and as shown in Fig. 9(a) is obtained by the vectorial combination of the earth's field vector and the permanent field vector. The angle $\delta$ shown in Fig. 9(a) represents the angular deviation of the compass reading from north which is positive in the example chosen for illustration. If the craft is now rotated in azimuth from its initial standing orientation and the difference between the compass indication of the system and the true magnetic heading is plotted, a deviation error curve will result. In the example selected, a single cycle error will appear with a positive deviation error being observed on north headings and a negative deviation error being observed on south headings. A representative deviation chart is shown in Fig. 8 in which the magnitude and sense of the deviation errors are depicted for the particular craft. The relation between the deviation error and the heading of the craft is clearly illustrated thereon. In such a ground swinging procedure, Fig. 9(b) shows the craft headed in a reverse position to its heading in Fig. 9(a). The vector diagram in this instance shows the deviation angle $\delta$ to be negative in character.

Instead of manually swinging the craft as illustrated in Fig. 9(b) to a south heading, the swinging in the improved procedure is accomplished electrically with the craft remaining in its original stationary condition. Accordingly, Fig. 9(c) representative of this condition includes all the elemental factors utilized in Figs. 9(a) and (b) and further includes a dash line arrow and vector representation respectively indicated as the electrical ground swinging field (E.G.S. field). In this instance, the electrical ground swinging field is directed oppositely to the earth's magnetic field and is of twice the magnitude. By the arrangement provided, the E.G.S. field is localized to the area of the flux valve only. The entire craft remains subject to the earth's field as initially oriented and the magnitude and direction of the disturbing permanent field remains as shown in Fig. 9(a). The net E.G.S. field vector is equal in magnitude to the earth's field and is oppositely directed as clearly shown in the vector diagram of Fig. 9(c). The resultant field vector and the angle δ which is also negative are identical to these factors as represented in Fig. 9(b) where the craft was manually turned through 180 degrees. In the electrical ground swinging operation, the permanent field and the flux valve are, in effect, turned through 180 degrees from north. Accordingly, by varying the direction and magnitude of the E.G.S. field in the manner illustrated in Fig. 10, the craft is electrically ground swung about magnetic north.

The operator at the control station 60 effects the electrical ground swinging operation by changing the settings of the potentiometers 71, 76, 63, 67 and 80 and switches 73, 64, 68 and 81 that constitute the controller elements of the station in accordance with the controller record or chart 84. This reproduces the directive fields corresponding to each of the azimuth directions observed in setting up the record. This step of the procedure accordingly consists in electrically ground swinging the stationary craft in accordance with the controller record by changing the settings of the controllers to reproduce the directive fields corresponding to each of the azimuth directions observed in the indicator 57.

The reproduced fields effective locally at the flux valve 10 result in movement of the compass cards 29 or 33 of the receiver element of the system located in the cabin of the craft under observation of the second operator. As the swinging operation takes place, the second operator observes the error in the heading of the craft indicated by the system for each of the respective observed directions contained on the record or chart 84. The intercommunication system between the operators enables either operator to make a record of the error observed which is due to the disturbing permanent field of the craft as represented in Fig. 9. An illustrative record of this character is shown in columns three and six of the deviation table depicted in Fig. 8. Where the system does not include a deviation compensator in the form of adjustable bar magnets or the type indicated at 85 in Fig. 5 of the drawing, the preparation of such a deviation table or chart may be considered the last step of our improved method. Where the system includes the directional gyro 35 and card 33 as the receiver element of the flux valve, the deviation heading errors are indicated on directional gyro controlled card.

The final step in the procedure consists in setting the deviation compensator of the system in accordance with the record of the observed deviation errors. This is accomplished with the record by physically setting the bar magnets of the type of compensator located at the flux valve accordingly. With the type of compensator shown at 85 in Fig. 5, the operator in the cabin of the craft adjusts the knobs 86 and 87 according to the record to correct the system for the deviation error by introducing direct current to the secondary windings of the flux valve.

For a given test location, coil unit 42 and control station 60, it will be understood that in practicing the improved method either to measure or correct for deviation errors, it is unnecessary, except at locations where secular changes of the earth's magnetic field are severe, to repeat the step herein described in preparing the E.G.S. chart 84. With the chart already prepared, the step utilizing the compass indicator 57 is also eliminated and the swinging operation is conducted by energizing the electrical ground swinging coil unit 42 from a control station 60 spaced from the system to create a plurality of regulated, electromagnetic fields at the flux valve 10 which with the horizontal component of the earth's magnetic field, Fig. 10, at the directed position of the craft, provide a number of resultant fields with directivity corresponding to a succession of known azimuth directions over a range of 360 degrees. The heading error is observed and the deviation compensators, if any, are adjusted in accordance with the previously described steps of our improved method.

This application contains certain features common to copending application Serial No. 567,203, filed February 23, 1956, for Method of Measuring and Compensating for Deviation Errors for Earth's Field Responsive Instruments in the names of Halpern, Depp and Trenchard and assigned to the same assignee as this application; this related application issuing concurrently herewith.

Since many changes could be made in the elements utilized in the improved method and many apparently widely different embodiments of this invention could be made without departing from the scope thereof, it is intended that all matter contained in the above description or shown in the accompanying drawings shall be interpreted as illustrative and not in a limited sense.

What is claimed is:

1. A method of correcting for deviation errors in a flux valve compass system with a settable deviation compensator which consists in orienting a stationary unit with a plurality of electrical ground swinging fixed coils in a predetermined direction in the earth's magnetic field, positioning a stationary craft with the system therein in the predetermined direction in the earth's magnetic field with the flux valve thereof adjacent the stationary unit and the compensator in a noncorrecting condition, energizing the fixed coils of the unit from a control station spaced from the system to create a plurality of regulated, electromagnetic fields at the flux valve which with the horizontal component of the earth's magnetic field at the directed position of the craft provide a number of resultant fields with directivity corresponding to a succession of known azimuth directions over a range of 360 degrees, observing the error in the indicated headings on the compass of the system for each of the respective created known directions, and setting the deviation compensator in accordance with the observed error to correct the system.

2. A method of correcting for deviation errors in a flux valve compass system with deviation compensating controllers that introduce direct current to the secondary windings of the flux valve which consists in orienting a stationary unit with a plurality of electrical ground swinging fixed coils in a predetermined direction in the earth's magnetic field, positioning a stationary craft with the system therein in the predetermined direction in the earth's magnetic field with the flux valve thereof adjacent the stationary unit and the deviation controllers in a noncorrecting condition, energizing the fixed coils of the unit from a control station spaced from the system to create a plurality of regulated, electromagnetic fields at the flux valve which with the horizontal component of the earth's magnetic field at the directed position of the craft provide a number of resultant fields with directivity corresponding to a succession of known azimuth directions over a range of 360 degrees, observing the error in the heading indicated on the compass of the system for each of the respective known directions, and introducing direct current to the secondary windings of the flux valve in accordance with a record of the observed errors.

3. A method of measuring deviation errors in a flux valve compass system which consists in orienting a stationary unit with a plurality of electrical ground swinging fixed coils in a predetermined direction in the earth's magnetic field, positioning a stationary craft with the system therein in the predetermined direction in the earth's magnetic field with the flux valve thereof adjacent the stationary unit, energizing the fixed coils of the unit from a control station spaced from the system to create a plurality of regulated, electromagnetic fields at the flux valve which with the horizontal component of the earth's magnetic field at the directed position of the craft provide a number of resultant fields with directivity corresponding to a succession of known azimuth directions over a range of 360 degrees, and preparing a deviation table by observation of the error in the indicated headings on the compass of the system for each of the respective created known directions.

4. A method of correcting for deviation errors in a flux valve compass system with a settable deviation compensator which consists in orienting a stationary unit with a plurality of field generating fixed coils therein and a magnetic field responsive azimuth direction indicator connected to and responsive to the field of the unit in a predetermined direction in the earth's magnetic field apart from the craft to utilize the system, electrically swinging the stationary unit and indicator over a range of 360 degrees through a succession of azimuth directions by introducing direct currents to the fixed coils through a number of settable electrical controllers to provide a directive field equivalent to the earth's field for each of the azimuth directions as observed on the indicator, making a record of the settings of the controllers for each of the observed azimuth directions, disconnecting and removing the azimuth direction indicator from the unit, positioning the craft with the system therein the unit oriented predetermined direction in the earth's magnetic field with the flux valve thereof in the relative position of the removed indicator and the compensator set in a noncorrecting condition, electrically ground swinging the stationary craft in accordance with the controller record by changing the settings of the controllers to reproduce the directive fields corresponding to each of the observed azimuth directions, observing the error in the heading indicated on the compass of the system for each of the respective observed directions, and setting the deviation compensator of the system in accordance with a record of the observed errors.

5. A method of correcting for deviation errors in a flux valve compass system with deviation compensating controllers that introduce direct current to the secondary windings of the flux valve which consists in orienting a stationary unit with a plurality of field generating fixed coils therein and a magnetic field responsive azimuth direction indicator connected to and responsive to the field of the unit in a predetermined direction in the earth's magnetic field apart from the craft to utilize the system, electrically swinging the stationary unit and indicator over a range of 360 degrees through a succession of azimuth directions by introducing direct currents to the fixed coils through a number of settable electrical controllers to provide a directive field equivalent to the earth's field for each of the azimuth directions as observed on the indicator, making a record of the settings of the controllers for each of the observed azimuth directions, disconnecting and removing the azimuth direction indicator from the unit, positioning the craft with the system therein in the unit oriented predetermined direction in the earth's magnetic field with the flux valve thereof in the relative position of the removed indicator and the deviation controllers in a noncorrecting condition, electrically ground swinging the stationary craft in accordance with the controller record by changing the settings of the controllers to reproduce the directive fields corresponding to each of the observed azimuth directions, observing the error in the heading indicated on the compass of the system for each of the respective observed directions, and introducing direct current to the secondary windings of the flux valve in accordance with a record of the observed errors.

6. A method of measuring deviation errors in a flux valve compass system which consists in orienting a stationary unit with a plurality of field generating fixed coils therein and a magnetic field responsive azimuth direction indicator connected to and responsive to the field of the unit in a predetermined direction in the earth's magnetic field apart from the craft to utilize the system, electrically swinging the stationary unit and indicator over a range of 360 degrees through a succession of azimuth directions by introducing direct currents to the fixed coils through a number of settable electrical controllers to provide a directive field equivalent to the earth's field for each of the azimuth directions as observed on the indicator, making a record of the settings of the controllers for each of the observed azimuth directions, disconnecting and removing the azimuth direction indicator from the unit, positioning the craft with the system therein in the unit oriented predetermined direction in the earth's magnetic field with the flux valve thereof in the relative position of the removed indicator, electrically ground swinging the stationary craft in accordance with the controller record by changing the settings of the controllers to reproduce the directive fields corresponding to each of the observed azimuth directions, and preparing a deviation table by observation of the error in the heading indicated on the compass of the system for each of the observed azimuth directions.

7. A method of correcting for deviation errors in a flux valve having directional gyro system with deviation compensating controllers that introduce direct current to the secondary windings of the flux valve which consists in orienting a stationary unit with a plurality of field generating fixed coils therein and a magnetic field responsive azimuth direction indicator connected to and responsive to the field of the unit in a predetermined direction in the earth's magnetic field apart from the craft to utilize the system, electrically swinging the stationary unit and indicator over a range of 360 degrees through a succession of azimuth directions by introducing direct currents to the fixed coils through a number of settable electrical controllers to provide a directive field equivalent to the earth's field for each of the azimuth directions as observed on the indicator, making a record of the settings of the controllers for each of the observed azimuth directions, disconnecting and removing the azimuth direction indicator from the unit, positioning the craft with the system therein in the unit oriented predetermined direction in the earth's magnetic field with the flux valve thereof in the relative position of the removed indicator and the deviation controller in a noncorrecting condition, electrically ground swinging the stationary craft in accordance with the controller record by changing the settings of the controllers to reproduce the directive fields corresponding to each of the observed azimuth directions, observing the error in the heading indicated on the card of the directional gyro of the system for each of the respective observed directions, and adjusting the compensating controllers in accordance with a record of the observed errors.

8. A method of measuring deviation errors in a flux valve compass system which consists in orienting a stationary unit with a plurality of electrical ground swinging fixed coils in a predetermined direction in the earth's magnetic field, positioning a stationary craft with the system therein in a predetermined direction in the earth's magnetic field with the flux valve thereof adjacent the unit, energizing the fixed coils of the stationary unit from a control station spaced from the system to create a plurality of regulated, electromagnetic fields at the flux valve which with the horizontal component of the earth's magnetic field at the directed position of the craft provide a number of resultant fields with directivity corresponding to a succession of known azimuth directions over a range of 360 degrees, and making a record of the deviation errors observed in the indicated headings on the compass of the system for each of the respective created known directions.

9. A method of measuring deviation errors in an earth's field responsive, indicating compass which consists in positioning a craft with the field responsive element of the compass thereon in a predetermined direction in the earth's magnetic field, electrically ground swinging the craft over a range of 360 degrees by creating a plurality of regulated, electromagnetic fields at the field responsive compass element which with the horizontal component of the earth's magnetic field at the predetermined position of the craft provide a number of resultant fields with directivity corresponding to a succession of known azimuth directions, and preparing a deviation table by observation of the error in the indicated heading on the compass for each of the respective created known directions.

10. A method of correcting for deviation errors in an earth's field responsive, indicating compass with a settable deviation compensator which consists in positioning a craft with the field responsive element of the compass thereon in a predetermined direction in the earth's magnetic field with the deviation compensator set in a noncorrecting condition, electrically ground swinging the craft over a range of 360 degrees by creating a plurality of regulated, electromagnetic fields at the field responsive compass element which with the horizontal component of the earth's magnetic field at the predetermined position of the craft provide a number of resultant fields with directivity corresponding to a succession of known azimuth directions, observing the error in the indicated heading on the compass for each of the respective created known directions, and setting the deviation compensator in accordance with the observed errors to correct the compass.

11. A method of correcting for deviation errors in a flux valve compass system with a settable deviation compensator which consists in positioning a craft with the system therein in a predetermined direction in the earth's magnetic field with the deviation compensator set in a noncorrecting condition, electrically ground swinging the craft over a range of 360 degrees by creating a plurality of regulated, electromagnetic fields at the flux valve which with the horizontal component of the earth's magnetic field at the predetermined position of the craft provide a number of resultant fields with directivity corresponding to a succession of known azimuth directions, observing the error in the indicated headings on the card of the system for each of the respective created known directions, and setting the deviation compensator in accordance with the observed errors to correct the system.

12. The method claimed in claim 11 in which the craft is positioned in stationary relation with respect to the earth in a northerly direction in the earth's magnetic field.

13. A method of correcting for deviation errors in a flux valve compass system with deviation compensating controllers that introduce direct current to the secondary windings of the flux valve which consists in positioning a craft with the system therein in a predetermined direction in the earth's magnetic field with the deviation compensating controllers in a non-correcting conditions, electrically ground swinging the craft over a range of 360 degrees by creating a plurality of regulated electromagnetic fields at the flux valve, which with the horizontal component of the earth's magnetic field at the predetermined position of the craft provide a number of resultant fields with directivity corresponding to succession of known azimuth directions, observing the error in the heading indicated by the system for each of the respective known directions, and introducing direct current to the secondary windings of the flux valve in accordance with a record of the observed errors.

14. A method of determining the deviation error in the magnetic compass of a navigable craft comprising the steps of: generating, in the absence of the craft and at a predetermined deviation-free reference location, a plurality of magnetic fields the directions of which are referenced to a predetermined direction with respect to magnectic north, which fields, together with the earth's magnetic field, produce a plurality of resultant magnetic fields directed at known angular directions throughout 362° whereby if said compass alone were placed in said resultant fields it would indicate said known directions; positioning said craft, with said compass normally installed therein and with its longitudinal axis aligned with said reference direction, at said location; regenerating, in the presence of said craft and compass, said plurality of resultant fields; and then determining the error between the direction then indicated by the compass and the known direction of said resultant fields.

15. A method of compensating for the deviation error in the magnetic compass of a navigable craft comprising the steps of: generating, in the absence of the craft and at a predetermined deviation-free reference location, a plurality of magnetic fields the directions of which are referenced to a predetermined direction with respect to magnetic north, which fields, together with the earth's magnetic field, produce a plurality of resultant magnetic fields directed at known angular directions throughout 360° whereby if said compass alone were placed in said resultant fields it would indicate said known directions; positioning said craft, with said compass normally installed therein and with its longitudinal axis aligned with said reference direction, at said location; regenerating, in the presence of said craft and compass, said plurality of resultant fields; determining the error between the direction then indicated by the compass and the known direction of said resultant fields; and then compensating said error by producing in the vicinity of said compass element a permanent magnetic field the direction of which is dependent upon the detected error.

References Cited in the file of this patent

UNITED STATES PATENTS

| | | |
|---|---|---|
| 2,396,244 | Borsum | Mar. 12, 1946 |
| 2,443,595 | Braddon | June 22, 1948 |
| 2,593,070 | Stuart | Apr. 15, 1952 |

FOREIGN PATENTS

| | | |
|---|---|---|
| 605,180 | Great Britain | July 16, 1948 |

UNITED STATES PATENT OFFICE
CERTIFICATE OF CORRECTION

Patent No. 2,887,873

May 26, 1959

William Halpern et al

It is hereby certified that error appears in the printed specification of the above numbered patent requiring correction and that the said Letters Patent should read as corrected below.

Column 3, line 10, for "depited" read -- depicted --; column 8, line 22, for "value" read -- valve --; column 12, line 17, for "having" read -- slaving --; column 13, line 50, for "conditions" read -- condition --; column 14, line 16, for "362°" read -- 360° --.

Signed and sealed this 29th day of March 1960.

(SEAL)
Attest:

KARL H. AXLINE
Attesting Officer

ROBERT C. WATSON
Commissioner of Patents